United States Patent
Sammataro et al.

(10) Patent No.: US 9,677,663 B2
(45) Date of Patent: Jun. 13, 2017

(54) GEAR GEOMETRY WITH FLUID RESERVOIR AND FLUID PATHS

(71) Applicant: Sikorsky Aircraft Corporation, Stratford, CT (US)

(72) Inventors: Stephen R. Sammataro, Madison, CT (US); Ryan Patry, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1021 days.

(21) Appl. No.: 13/930,488

(22) Filed: Jun. 28, 2013

(65) Prior Publication Data
US 2015/0260274 A1 Sep. 17, 2015

(51) Int. Cl.
*B64C 27/00* (2006.01)
*F16H 57/04* (2010.01)
*B64C 27/12* (2006.01)

(52) U.S. Cl.
CPC ......... *F16H 57/0442* (2013.01); *B64C 27/12* (2013.01); *F16H 57/045* (2013.01); *F16H 57/0431* (2013.01); *Y10T 74/19991* (2015.01); *Y10T 74/19995* (2015.01)

(58) Field of Classification Search
USPC ......... 244/17.11, 1 R, 53 R; 184/6.12, 12, 5, 184/81; 60/39.08; 475/159
See application file for complete search history.

(56) References Cited

U.S. PATENT DOCUMENTS

| | | | |
|---|---|---|---|
| 3,495,471 A | 2/1970 | Johnson | |
| 3,608,672 A | 9/1971 | Dandridge | |
| 5,340,279 A | 8/1994 | Cycon et al. | |
| 5,351,913 A | 10/1994 | Cycon et al. | |
| 5,364,230 A | 11/1994 | Krauss et al. | |
| 5,928,100 A | 7/1999 | Ohtake et al. | |
| 7,214,157 B2 | 5/2007 | Flamang et al. | |
| 7,387,189 B2 | 6/2008 | James et al. | |
| 7,651,049 B2 | 1/2010 | Carnelli et al. | |
| 7,677,868 B2 | 3/2010 | Chaudhry et al. | |
| 8,181,746 B2 | 5/2012 | Szolomayer et al. | |
| 8,267,826 B2 | 9/2012 | Duong et al. | |
| 8,381,878 B2 | 2/2013 | DiBenedetto | |
| 9,272,777 B2 * | 3/2016 | McGlaun | B64C 27/12 |
| 2007/0261922 A1 * | 11/2007 | Mullen | B64C 27/14 184/6.12 |
| 2008/0042507 A1 * | 2/2008 | Edelson | F02C 7/268 310/164 |
| 2008/0268997 A1 | 10/2008 | Gooden | |
| 2011/0138817 A1 * | 6/2011 | Vialle | F01D 15/12 60/775 |
| 2012/0088624 A1 | 4/2012 | Sheridan et al. | |
| 2012/0181112 A1 | 7/2012 | Szolomayer et al. | |
| 2012/0192570 A1 | 8/2012 | McCune et al. | |

(Continued)

*Primary Examiner* — Christopher P Ellis
(74) *Attorney, Agent, or Firm* — Cantor Colburn LLP

(57) ABSTRACT

A helicopter is provided and includes an engine, a rotor, a gear train configured to transmit torque from the engine to the rotor such that the rotor is rotatable about an axis of rotation, a primary lubrication system, which is configured to supply the gear train with a fluid and a secondary lubrication system disposed in a gear of the gear train, including a fluid reservoir, which is configured to receive and store the fluid and to continue to supply the gear train with the fluid following a failure of the primary lubrication system.

20 Claims, 3 Drawing Sheets

(56) References Cited

U.S. PATENT DOCUMENTS

| | | | |
|---|---|---|---|
| 2012/0192974 A1 | 8/2012 | Szolomayer et al. | |
| 2012/0227820 A1* | 9/2012 | Poster | B64C 13/42 |
| | | | 137/1 |
| 2014/0001307 A1* | 1/2014 | Ehinger | B64C 27/12 |
| | | | 244/17.11 |
| 2014/0144287 A1* | 5/2014 | McGlaun | F16H 57/0416 |
| | | | 74/606 A |
| 2015/0314745 A1* | 11/2015 | Kepley | B60R 21/0132 |
| | | | 701/45 |
| 2016/0258322 A1* | 9/2016 | Winn | F01D 25/145 |
| 2016/0311527 A1* | 10/2016 | Poster | F16H 57/0449 |
| 2016/0341123 A1* | 11/2016 | Socha | F01D 9/065 |

\* cited by examiner

Rotation of the body 41 about the poloidal axis

GEAR GEOMETRY WITH FLUID RESERVOIR AND FLUID PATHS

BACKGROUND OF THE INVENTION

The subject matter disclosed herein relates to gear geometry with a fluid reservoir and fluid paths.

Helicopters or other rotary wing aircraft typically include an airframe having a fuselage that defines a cabin in an interior thereof, a main rotor section and a tail section. One or more engines may be operably disposed within the airframe, a main rotor may be rotatably supported at the main rotor section and a tail rotor may be rotatably supported at the tail section. The main rotor is supported by a main rotor shaft and is disposed to rotate about an axis of rotation defined along a longitudinal axis of the main rotor shaft. The rotation of the main rotor provides for lift force of the helicopter. The tail rotor is supported by a tail and rotation of the tail rotor provides anti-torque control of the helicopter. Helicopters may further include a gear train operably interposed between the one or more engines and at least the main and tail rotors. The gear train is thereby configured to transmit torque from the one or more engines to at least the main and tail rotors to drive rotation of the rotors about the respective axes of rotation.

Thus, in order to cool and lubricate its various components including the gear train, helicopters and other rotary wing aircraft often include lubrication systems. These systems may be arranged in redundant configurations in a given helicopter, for example, and provide lubricant to moving parts under normal operating conditions. Thus, if a primary lubrication system fails, a secondary lubrication system can be initiated to provide adequate supplies of lubricant for continued cooling and lubrication.

In many cases, the secondary lubrication systems rely on sensors to detect failures in the primary lubrication systems and may be initiated automatically or manually by an operator. In either case, the secondary lubrication systems are themselves prone to failures or are subject to operator error.

BRIEF DESCRIPTION OF THE INVENTION

According to one aspect of the invention, a helicopter is provided and includes an engine, a rotor, a gear train configured to transmit torque from the engine to the rotor such that the rotor is rotatable about an axis of rotation, a primary lubrication system, which is configured to supply the gear train with a fluid and a secondary lubrication system disposed in a gear of the gear train, including a fluid reservoir, which is configured to receive and store the fluid and to continue to supply the gear train with the fluid following a failure of the primary lubrication system.

According to another aspect of the invention, a gear box to transmit torque from an engine to a driven element is provided. The gear box includes a gear train configured to transmit the torque from the engine to the driven element. The gear train includes a gear and the gear includes a body having an axis of rotation, an axial face oriented transversely with respect to the axis and a radial face oriented transversely with respect to the axial face. The axial face is formed to define a fluid reservoir, and fluid paths defined in the body extend from the fluid reservoir to the radial face and are rotatable about the axis to encourage a flow of fluid from the fluid reservoir, through the holes and to the radial face.

According to yet another aspect of the invention, a gear is provided and includes an annular body having a poloidal axis, opposed axial faces oriented transversely with respect to the poloidal axis and inward and outward radial faces extending between the first and second axial faces, an aperture in the radial face extending between the first and second axial faces, a rim included in at least one of the axial faces and a first channel recessed from a plane of the rim in a direction defined along the poloidal axis and shaped to hold a fluid and holes in the annular body defining fluid paths extending from the first channel to the outward radial face such that the fluid passes from the first channel though the fluid paths when the gear is rotated.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As described below, a secondary lubrication system is provided for a helicopter or other rotary wing aircraft that operates continuously and will continue to operate when the primary system fails. The secondary lubrication system is a passive system that operates without any intervention from sensors or an operator and is thus less prone to failures than other secondary lubrication systems and is not subject to operator error.

Figure 1:
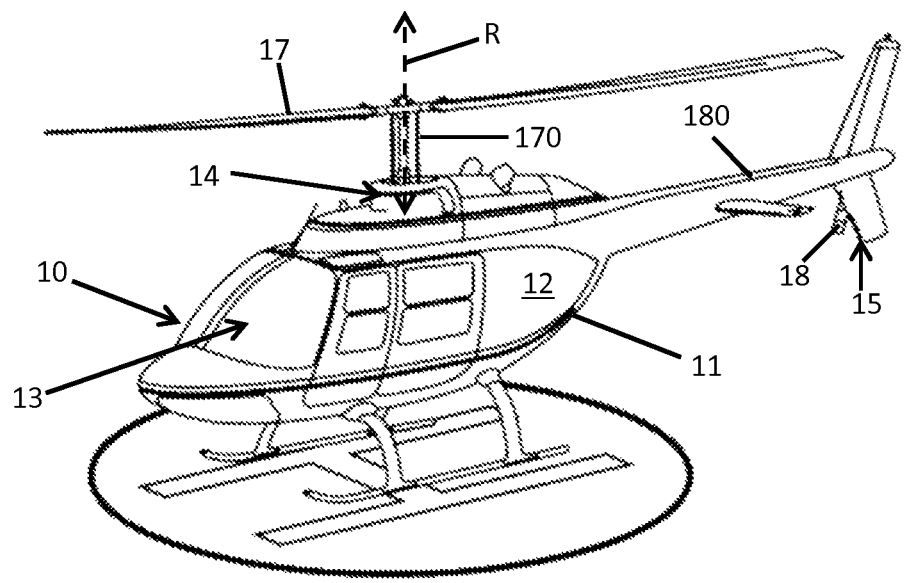
FIG. 1 is a schematic illustration of a helicopter in accordance with embodiments.
Figure 2:
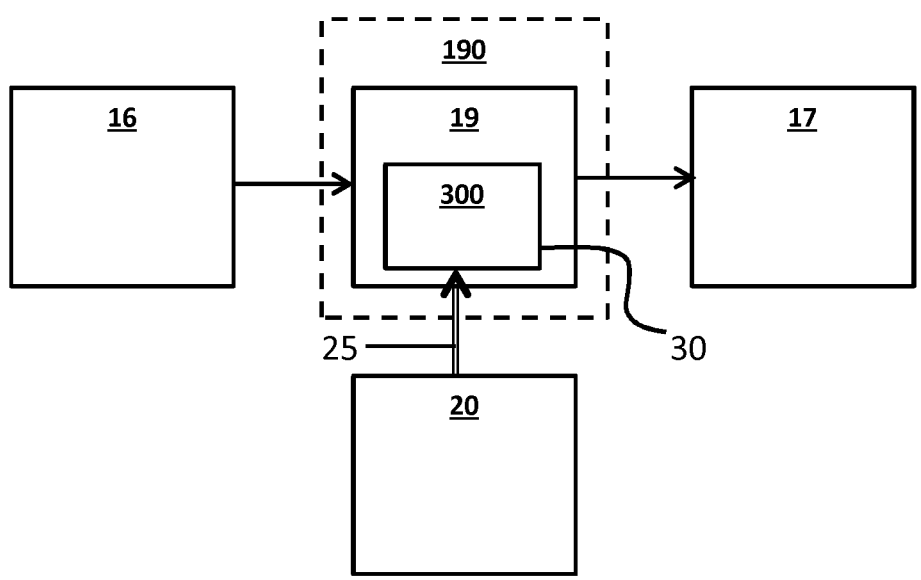
FIG. 2 is a schematic illustration of helicopter components in accordance with embodiments.

With reference to FIGS. 1 and 2, a helicopter 10 is provided. The helicopter 10 includes an airframe 11 having a fuselage 12. The fuselage 12 defines a cabin 13 in an interior thereof, a main rotor section 14 and a tail section 15. One or more engines 16 may be operably disposed within the airframe 11, a main rotor 17 may be rotatably supported at the main rotor section 14 and a tail rotor 18 may be rotatably supported at the tail section 15. The main rotor 17 is supported by a main rotor shaft 170 and is disposed to rotate about an axis of rotation R defined along a longitudinal axis of the main rotor shaft 170. The rotation of the main rotor 17 provides for lift force of the helicopter 10. The tail rotor 18 is supported by a tail 180 and rotation of the tail rotor 18 provides for anti-torque control of the helicopter 10. While shown as a helicopter having a single main rotor 17 and a tail rotor 18, it is understood that aspects can be used with other types of helicopters including those with coaxial rotors, such as the X2® helicopter.

As shown in FIG. 2, the helicopter 10 further includes a gear box 190, a primary lubrication system 20 and a secondary lubrication system 30. The gear box 190 includes a gear train 19 that is operably interposed between the one or more engines 16 and at least the main rotor 17. The gear train 19 is thereby disposed and configured to transmit torque from the one or more engines 16 to at least the main rotor 17 (or, more generally, a driven element). The transmission of torque drives rotation of the main rotor 17 about the axis of rotation R. The primary lubrication system 20 may include a pump and passages configured for providing fluid 25, such as lubrication (e.g., oil), to at least the gear train 19.

The secondary lubrication system 30 may be provided within, at or as a component of the gear train 19 and includes a fluid reservoir 300 to be described below. The fluid reservoir 300 is configured to receive the fluid 25 from the primary lubrication system 20 and to store the fluid 25 such that the secondary lubrication system 30 can continue to supply at least the gear train 19 with the fluid 25 following a failure of the primary lubrication system 20.

Figure 3A:
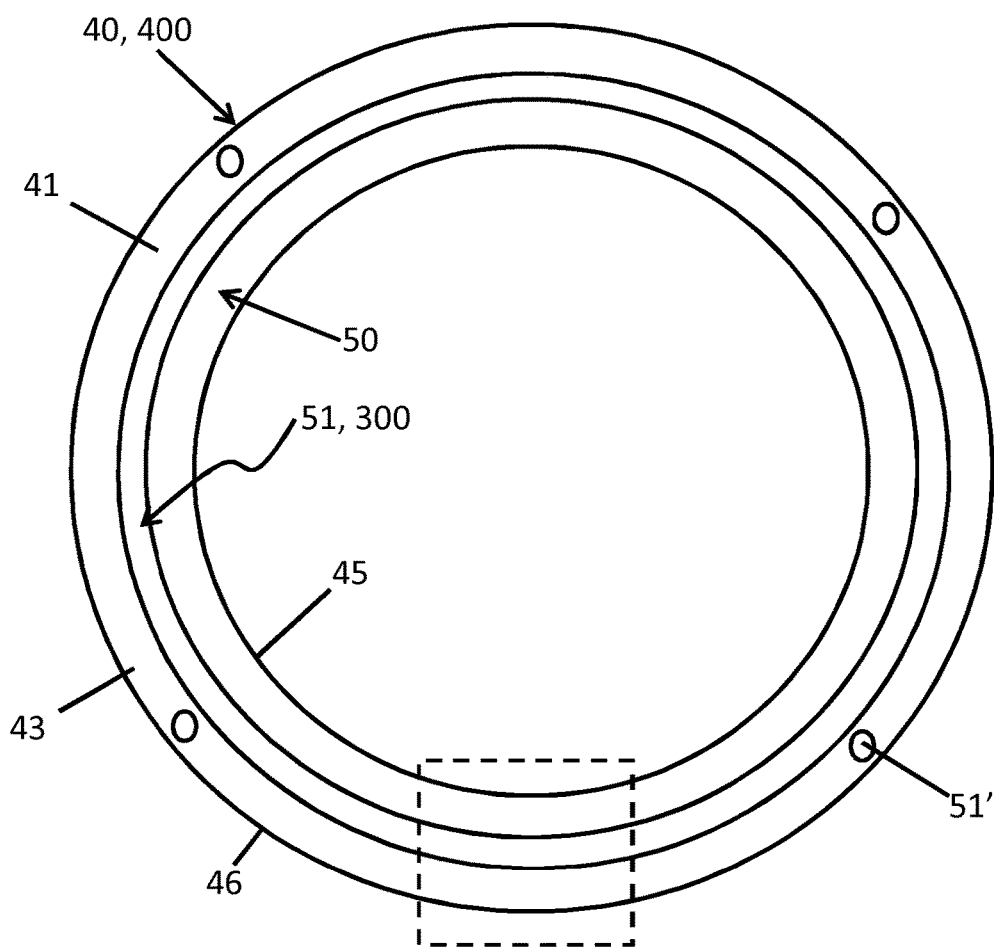
FIG. 3A is a plan view of a gear in accordance with embodiments.
Figure 3B:
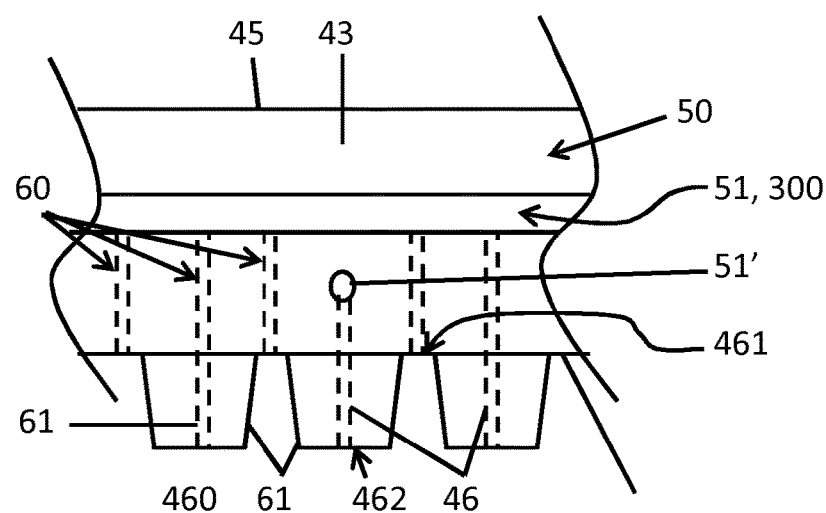
FIG. 3B is an enlarged version of the portion of FIG. 3A bordered by the dotted line.
Figure 4:
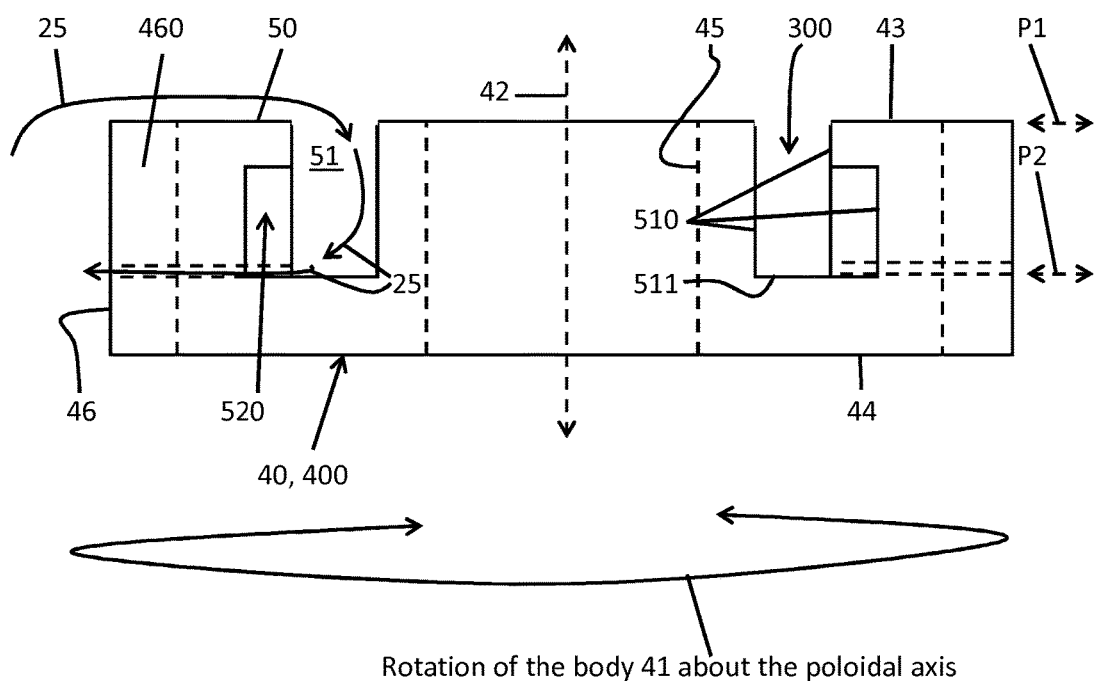
FIG. 4 is an elevational view of a cross-section of the gear of FIGS. 3A and 3B in accordance with embodiments.

With reference to FIGS. 3A, 3B and 4, the gear train 19 includes a gear 40 such as a cylindrical gear 400. As shown in FIGS. 3A and 3B, the gear 40 includes a body 41, which may be but is not required to be annular in shape. The body 41 can be made of steel and be carburized. The gear 40 has a poloidal axis 42 (i.e., an axis of rotation), which may in some cases be aligned with the axis of rotation R (see FIG. 1). The gear 40 has a first axial face 43, a second axial face 44, which is opposite the first axial face 43, an inward radial face 45 and an outward radial face 46, which is opposite the inward radial face 45. The body is rotatable about the poloidal axis 42 along with the rotation of the main rotor 17. The first axial face 43 and the second axial face 44 are each oriented transversely with respect to the poloidal axis 42. The inward radial face 45 and the outward radial face 46 each extend between the first axial face 43 and the second axial face 44.

The inward radial face 45 may be smooth while the outward radial face 46 may include gear teeth 460 for registration with another gear of the gear train 19. The gear teeth 460 may be hardened to a greater degree than a remainder of the body 41 (e.g., 60 Rockwell vs. 45 Rockwell). As shown in FIG. 4, at least one of the first and second axial faces 43 and 44 includes a rim 50 at a first plane P1 that may but is not required to extend circumferentially around the body 41. The rim 50 is formed to define a first channel 51 having a second channel 520, which acts as the fluid reservoir 300. The first channel 51 may but is not required to be cylindrical and to extend circumferentially along the rim 50. The first channel 51 is formed such that the first channel 51 is recessed from the first plane P1 and into the body 41 in a direction defined along the poloidal axis 42. The first channel 51 may be but is not required to be co-axial with the gear 40.

The size and shape of the first channel 51 are delimited by radial sidewalls 510 and an axial face 511 at a second plane P2. The second channel 520 extends into the outermost radial sidewall 510 such that, when rotating, the fluid 25 does not leak out of the first channel 51. A distance between the first and second planes P1 and P2 is defined as a height of the first channel 51. In accordance with embodiments, the first axial face 43 may be disposed to normally face upwardly relative to the poloidal axis 42. In this case, the first axial face 43 may include the rim 50, which is in turn formed to define the first channel 51. For purposes of clarity and brevity, the following description will relate to this case but it is to be understood that both the first axial face 43 and the second axial face 44 can include a rim 50, which is formed to define a first channel 51.

Although the body 41 is shown in FIG. 4 as being annular in shape, and the first channel 51 and/or the second channel 520 is shown in FIG. 4 as extending circumferentially around the annular body 41 in an annular shape and having a rectangular cross-section, it is understood that the first channel 51 and/or the second channel 520 can be annular or may have multiple varied configurations. That is, the first channel 51 and/or channel 520 may be formed at local portions of the body 41 without extending circumferentially around the body 41 and can have any cross-sectional shape deemed appropriate. For example, the first channel 51 and/or the second channel 520 may extend circumferentially around the annular body 41, the first channel 51 and/or the second channel 520 may extend partially circumferentially around the annular body 41, the first channel 51 and/or channel 520 may be linear or the first channel 51 and/or the second channel 520 may be formed as a divot 51' (see FIGS. 3A and 3B) in the body 41.

Still referring to FIGS. 3A, 3B and 4, the body 41 includes radially oriented holes 60 that define fluid paths 61. As shown in FIGS. 3A, 3B and 4, the fluid paths 61 extend radially outwardly from the first channel 51 and the second channel 520 to the outward radial face 46 and into the gear train 19 as a whole. More particularly, the fluid paths 61 may extend radially outwardly from one of the sidewalls 510 to the outward radial face 43. In accordance with still further embodiments, the fluid paths 61 may extend from the corner defined at the interface between the radially outward one of the sidewalls 510 and the axial face 511 to the outward radial face 26. With the body 41 being rotatable with the main rotor 17, fluid stored in the first channel 51 and the second channel 520 will be encouraged to flow through the holes 60 and along the fluid paths 61 to the outward radial face 46 by centrifugal force.

In accordance with embodiments, the holes 60 may be positioned between the gear teeth 460 (i.e., in the roots 461 of the gear teeth 460) or at the gear teeth 460 (i.e., in the top lands 462 of the gear teeth 460). In accordance with further non-limiting embodiments, the body 41 may be about 5 inches wide, 1.5 inches thick and 2.5 inches tall, while the holes 60 may be about 0.0025-0.0075 inches in diameter. In accordance with still further embodiments, the holes 60 may have varying diameters at various circumferential locations of the body 41. Further, while shown as having a straight path 61 extending radially through the body 41, one or more of the fluid paths 61 could be curved and/or angled relative to the radial direction.

As shown in FIG. 4, when the primary lubrication system 20 is operational, the fluid 25 is pumped toward at least the gear train 19. In the above-noted exemplary configuration in which the first axial face 43 is disposed to normally face upwardly relative to the gravitational direction and includes the rim 50, which is in turn formed to define the first channel 51, the first channel 51 and the second channel 520 act as the fluid reservoir 300. That is, the fluid 25 overflows over the body 41 and into the fluid reservoir 300 where it is stored until needed. In some cases, normal operation of the primary lubrication system 20 would result in the fluid line being well above the body 41 such that all or most of the gear train 19 is fully inundated.

However, when the primary lubrication system 20 breaks down or otherwise fails to direct a full quantity of the fluid 25 toward at least the gear train 19, the fluid line may fall below the body 41. In this case, the secondary lubrication system 30 continues to operate without the need for sensors or operator controls. The passive nature of the secondary lubrication system 30 is provided by the stored of the fluid 25 in the first channel 51 and the second channel 520 (which act as the fluid reservoir 300) pooling against the radially outward sidewalls 510 as a result of the rotation of the body about the poloidal axis 42. The continued rotation of the body 41 about the poloidal axis 42 encourages continued flow of the fluid 25 from the pooling in the first channel 51/fluid reservoir 300 (i.e., the first channel 51 and the second channel 520), through the holes 60 and along the fluid paths 61 to the outward radial face 46 by centrifugal force.

With the above-described configuration, the secondary lubrication system 30 may continue to provide a quantity of the fluid 25 to at least the gear train 19 for a predefined time following a breakdown or failure of the primary lubrication system 20. As such, the size and shape of the first channel 51/fluid reservoir 300/holes 60 may be defined such that a sufficient quantity of the fluid 25 can continue to be delivered during the predefined time. Further, while described in terms of the poloidal axis 42 being substantially aligned with gravity, it is understood that the poloidal axis 42 could be at an angle to gravity as the centrifugal force of the gear rotation will keep fluid stored in the first channel 51 and/or the second channel 520.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects can be used in other mechanical machines having gears needing lubrication, such as in automobiles, ships, outdoor power equipment and other such systems. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gear box to transmit torque from an engine to a driven element, the gear box comprising:
    a gear train configured to transmit the torque from the engine to the driven element, the gear train including a gear configured to be used within a secondary lubrication system of said gear train, said gear comprising:
    a body having an axis of rotation, an axial face oriented transversely with respect to the axis and a radial face oriented transversely with respect to the axial face,
    the axial face being formed to define a fluid reservoir, and
    fluid paths defined in the body extending from the fluid reservoir to the radial face and being rotatable about the axis to encourage a flow of fluid from the fluid reservoir, through the holes and to the radial face.

2. The gear box according to claim 1, wherein the gear comprises a cylindrical gear.

3. The gear box according to claim 1, wherein the fluid comprises lubricant.

4. The gear box according to claim 3, further comprising a primary lubrication system configured to provide the lubricant to the gear train.

5. The gear box according to claim 4, wherein the lubricant overflows into the fluid reservoir.

6. The gear box according to claim 4, wherein the fluid reservoir has sufficient volume to maintain a supply of lubricant therein for a predefined flight time following a failure of the primary lubrication system.

7. A gear configured to be used within a secondary lubrication system of a gear train, said gear comprising:
    an annular body having a poloidal axis, opposed axial faces oriented transversely with respect to the poloidal axis and inward and outward radial faces extending between the first and second axial faces,
    an aperture in the radial face extending between the first and second axial faces,
    a rim included in at least one of the axial faces and a first channel recessed from a plane of the rim in a direction defined along the poloidal axis and shaped to hold a fluid, and
    holes in the annular body defining fluid paths extending from the first channel to the outward radial face such that the fluid passes from the first channel though the fluid paths when the gear is rotated.

8. The gear according to claim 7, wherein the outward radial face comprises gear teeth.

9. The gear according to claim 8, wherein the gear teeth are hardened to a greater degree than a remainder of the annular body.

10. The gear according to claim 8, wherein the holes are positioned at roots between the gear teeth.

11. The gear according to claim 8, wherein the holes are positioned at top lands of the gear teeth.

12. The gear teeth according to claim 8, wherein the holes are about 0.0025-0.0075 inches in diameter.

13. The gear according to claim 7, wherein the annular body comprises one or more of steel or carburized steel.

14. The gear according to claim 7, wherein the annular body is disposable such that the poloidal axis is aligned with gravity.

15. The gear according to claim 7, wherein the first channel is receptive of and configured to store fluid.

16. The gear according to claim 15, wherein the annular body is rotatable about the poloidal axis to thereby encourage a flow of the received and stored fluid through the holes.

17. The gear according to claim 7, wherein the gear is a portion of a gear train of a helicopter, the helicopter further comprising an engine and a rotor, and the gear train is configured to transmit torque from the engine to the rotor such that the rotor is rotatable about an axis of rotation.

18. The gear according to claim 17, wherein the helicopter further comprises a primary lubrication system configured to supply the gear train with a fluid.

19. The gear according to claim 18, wherein the gear includes a fluid reservoir configured to receive and store the fluid and to supply the gear train with the fluid following a failure of the primary lubrication system.

20. The gear according to claim 19, wherein the holes in the annular body extend from the fluid reservoir into the gear train.

* * * * *